United States Patent Office 2,695,212
Patented Nov. 23, 1954

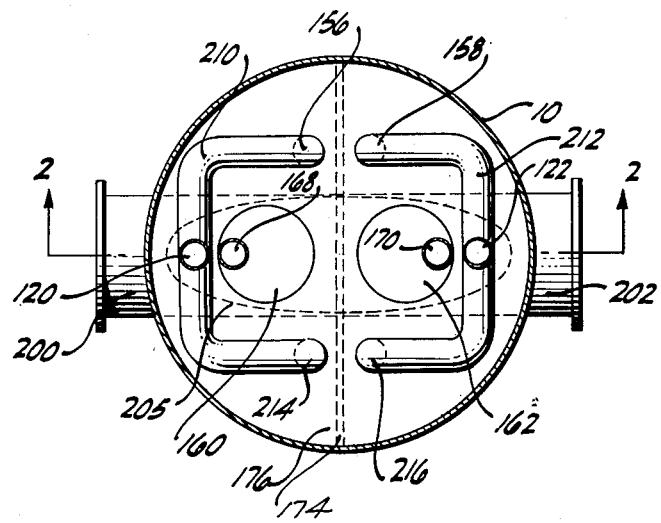
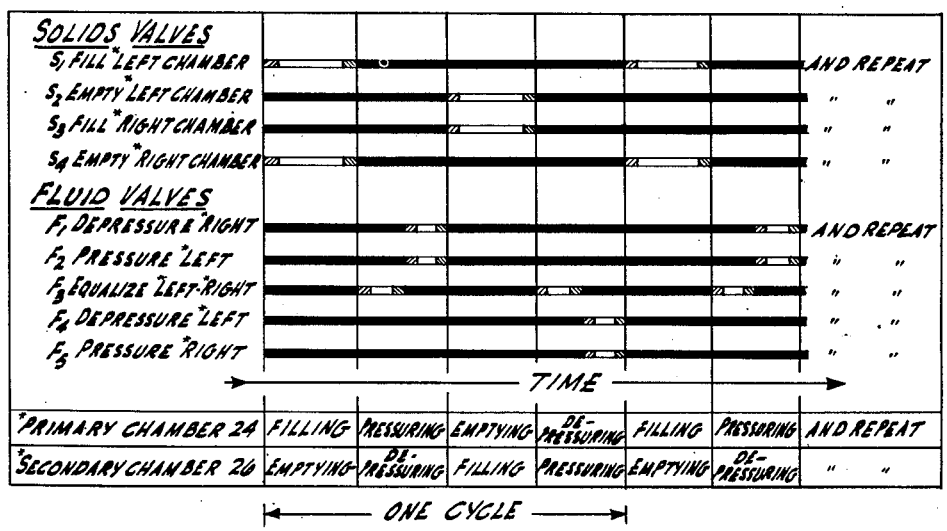

2,695,212

HANDLING OF GRANULAR SOLIDS

Clyde H. O. Berg, Long Beach, Calif., assignor to Union Oil Company of California, Los Angeles, Calif., a corporation of California Application March 24, 1951, Serial No. 217,337

32 Claims. (Cl. 23—1)

This invention relates to improvements in operations involving the movement of granular solids such as in the contacting of gases or vapors with moving granular adsorbents or catalysts. More particularly this invention relates to an improved process and apparatus for handling or conveying the granular solids in such a continuous contacting process or any other operation in which granular solids are to be conveyed. Specifically this invention relates to an improved method and apparatus for the conveying of granular solids in substantially compact form, that is the granular solids move as a compact porous mass of granular solids having substantially the same bulk density as the settled compacted granular solids do when at rest and unaerated. The granular solids are conveyed through an elongated conduit under the influence of a depressuring conveyance fluid moving concurrently with the solids.

A specific embodiment of this invention is drawn to a method and apparatus for pressuring the granular solids to be conveyed into the solids inlet of the conveyance conduit in a continuous stream and at high rates of flow.

Operations employing moving beds of substantially compact solids, such as catalysts for chemical reactions, are well known in the art and perhaps the most publicized example is the T. C. C. process for catalytic cracking of hydrocarbons. In this process a regenerator and a reactor are employed in separate vessels, the catalyst being passed in substantially compact form downwardly by gravity through each vessel. A pair of bucket elevators are generally used to raise the catalyst from the bottom of each vessel for introduction into the top of the other. While elevators of this type are efficient from an energy requirement standpoint, they are somewhat difficult to maintain at the operating temperatures of from 800° F. to 1100° F. and considerable grinding of solids to fines is experienced.

The primary object of the present invention is to provide an improved process and apparatus for carrying out operations involving the contact of gases or vapors with granular solids either in substantially compact form or where fluidized particles of catalyst, oil shale, coke, tar sand and the like are treated at elevated temperatures or where solid particles are merely heat treated such as in lime burning.

A further object of this invention is to provide an improved process and apparatus for the contacting of gaseous or vaporous reactants with a substantially compact moving bed of granular catalyst.

Another object of this invention is to provide in operations involving moving beds of solids an improved method and apparatus for conveying these solids in the absence of elevators or other moving mechanical devices from the bottom of a vessel to the top of the same or different vessel substantially without abrasion or attrition loss.

A more specific object of the present invention is to provide in moving bed operations an improved method for conveying such solids in substantially compact form upwardly through lift lines from the bottom to the top of the same or a different vessel in the presence of a cocurrent flow of depressuring lift gas.

An additional object of the present invention is to provide a process and apparatus having the aforesaid improved solids conveyance operation in the refining of fractions of crude petroleum wherein said fractions are contacted at reaction temperature and pressure conditions with a substantially compact moving bed of solids such as a catalyst in such petroleum refining operations as cracking, coking, hydroforming, and desulfurization as well as others.

It is a specific object of this invention to provide an improved method and apparatus for introducing granular solids to be conveyed into such a lift line or conveyance conduit at high rates of flow without substantial abrasion or attrition of the solids and in which a continuous flow is achieved.

A more specific object of this invention is to provide an improved apparatus to accomplish the aforementioned objects and specifically to provide an improved apparatus for the transfer of granular solids continuously and at high rates of flow from a system at one pressure to another system at a relatively higher pressure.

Other objects and advantages of the present invention will become apparent to those skilled in the art as the description thereof proceeds.

Briefly the present invention comprises a method for the conveyance of granular solids in substantially compact form under the influence of a concurrent depressuring conveyance fluid and further comprises the combination of this conveyance with a method and apparatus for contacting the granular solids thus conveyed with a gaseous or vaporous fluid in the various well known contacting and catalytic reactions. The granular solids to be conveyed are introduced from a relatively low pressure system through the particular solids pressuring apparatus of the present invention hereinafter described into the inlet opening of the conveyance conduit. The inlet of the conduit is maintained at a relatively higher pressure generally than the pressure of the solids before introduction into the conveyance conduit. The granular solids are then transferred through the conveyance conduit in compact form by means of a cocurrently depressuring conveyance fluid. The frictional forces generated by the conveyance fluid depressuring through the interstices of the compact mass of solids are sufficient to counteract opposing forces of friction of the solids sliding against the walls of the conduit as well as the opposing force of gravitation and thereby establish movement of the compact porous granular mass in the direction of decreasing conveyance fluid pressure.

The depressuring conveyance fluid hereby generates a pressure drop per unit length of conduit $$\frac{dp}{dl}$$

sufficient to overcome the opposing gravitational forces ($\rho_s \cos \theta$) wherein $\rho_s$ is the bulk density of the granular solids and $\theta$ is the angular deviation of the conveyance conduit from the vertical. The ratio of the former to the latter is $$\frac{\frac{dp}{dl}}{\rho_s \cos \theta}$$

This factor is termed the conveyance force ratio and is the ratio of the force tending to move the solids through the conveyance conduit to the opposing forces of gravity tending to restrain such flow. The conveyance fluid must be depressured through the conduit at a rate sufficient to raise the conveyance force ratio to a value greater than 1.0 (factors in consistent units) in order that the conveying force exceed the forces resisting flow. The amount by which the conveyance force ratio must exceed a value of 1.0 is equal to the magnitude of the friction forces also tending to resist solids flow.

The granular solids are maintained during conveyance in the same compact form by means of the application of a compressive force on the discharge solids issuing from outlet of the conveyance conduit. Various means are available for applying such a force which has the effect of restricting the discharge rate of granular solids from the conveyance conduit but has virtually no affect on the discharge of the conveyance fluid therefrom. A transverse thrust plate or a grid may be spaced opposite and adjacent the outlet opening or a static bed of solids may be used to submerge this outlet.

The granular solids thus are maintained during conveyance in an unsuspended non-fluidized substantially compact continuous mass of granular solids through the conveyance conduit.

The pressure differential between the inlet and outlet of a conveyance conduit according to this invention is many times greater than similar pressure differentials existing when the granular solids are conveyed by means of the well known "gas lift" or pneumatic types of conveyors in which the solids particles are suspended in a gas stream moving at high velocity. Therefore granular solids to be conveyed and existing at atmospheric pressure must be pressured to an elevated pressure higher than atmospheric pressure by an amount substantially equal to the pressure differential existing between the inlet and outlet of the conveyance conduit of this invention when such a conduit is discharging solids at substantially atmospheric pressure. If the discharge pressure is higher than atmospheric the inlet pressure is higher and a correspondingly higher degree of pressuring of the solids to be conveyed is required in order to introduce the solids into the conveyance conduit.

Such a pressuring of granular solids may be effected in a number of ways, including passing the solids through the various types of commercially available star feeders in which flow of granular solids in one direction is allowed while a counter flow of conveyance fluid is inhibited. Such apparatus operates fairly well at moderately low differential pressures of the order of 3 to 10 lbs./sq. in. However, no satisfactory method or apparatus is presently available for pressuring granular solids at substantial rates through pressure differentials materially greater than that given above. Therefore, a specific portion of the present apparatus is herein described which permits the pressuring of granular solids through pressure differentials from as low as 10 lbs./sq. in. and lower to as high as 250 lbs./sq. in. or higher with high efficiency and an absolute minimum of fluid counter flow.

This particular piece of equipment as hereinafter described specifically cofunctions with the conveyance conduit of this invention wherein substantially compact granular solids are conveyed to provide a conveyance apparatus of very high efficiency and in which volumetric flow rates of granular solids are permitted which were heretofore not possible with the conventional mechanical and gas lift or suspension types of conveyors of equal size. Furthermore, the combination pressuring device and compact solids flow conveyor herein described further actively cooperates in the well known recirculatory solids-fluid contacting processes to provide an efficient contacting process in which solids-to-fluid ratios heretofore unattainable are now permitted and in which the loss of solid material circulated due to attrition or abrasion is reduced to an absolute minimum. Since during conveyance each solid granule is prevented from moving with respect to any other particle, the high attrition rates characteristic of gas lift or suspension conveyances due to the high velocity impact of particle against particle or particle against the conveyor walls or the abrasion due to loading and unloading a mechanical conveyor are in the present combination process and apparatus totally absent. Thus, the accumulation of fine materials due to abrasion and attrition in the circulating mass of granular solids is reduced to a minimum thereby minimizing in the contacting process the well known phenomenon of channeling or by-passing of fluids through the granular bed along the path of least resistance afforded by that part of the bed containing the least solids fines. In hydrocarbon catalysis a more uniform utilization of the catalyst is thereby obtained, uniform contact of the hydrocarbon feed stock with the catalyst is also obtained and furthermore product contamination due to unreacted or insufficiently treated feed stock is eliminated. It has been further found that the presence of fine solids in moving masses of solid granules causes a phenomenon termed "bumping" which manifests itself as a low frequency vibration in the equipment caused by the starting and stopping of the granular solids flow in the contacting vessel or associated transfer lines. Thus, the application of the specific improvement of the present invention provides a greatly improved method and apparatus not only for conveying granular solids but also conveying such solids in recirculatory fluid-solids contacting processes greatly used in present-day industrial operations.

The process and apparatus of the present invention is more clearly understood in connection with the accompanying drawings, in which:

Figure 3 shows a plan view in cross section of the pressuring device of Figure 2; and Figure 4 depicts a typical operating cycle in which the sequence of operation of the four solids flow block valves and the conveyance fluid pressuring and depressuring valves is shown chronologically.

Figure 1:
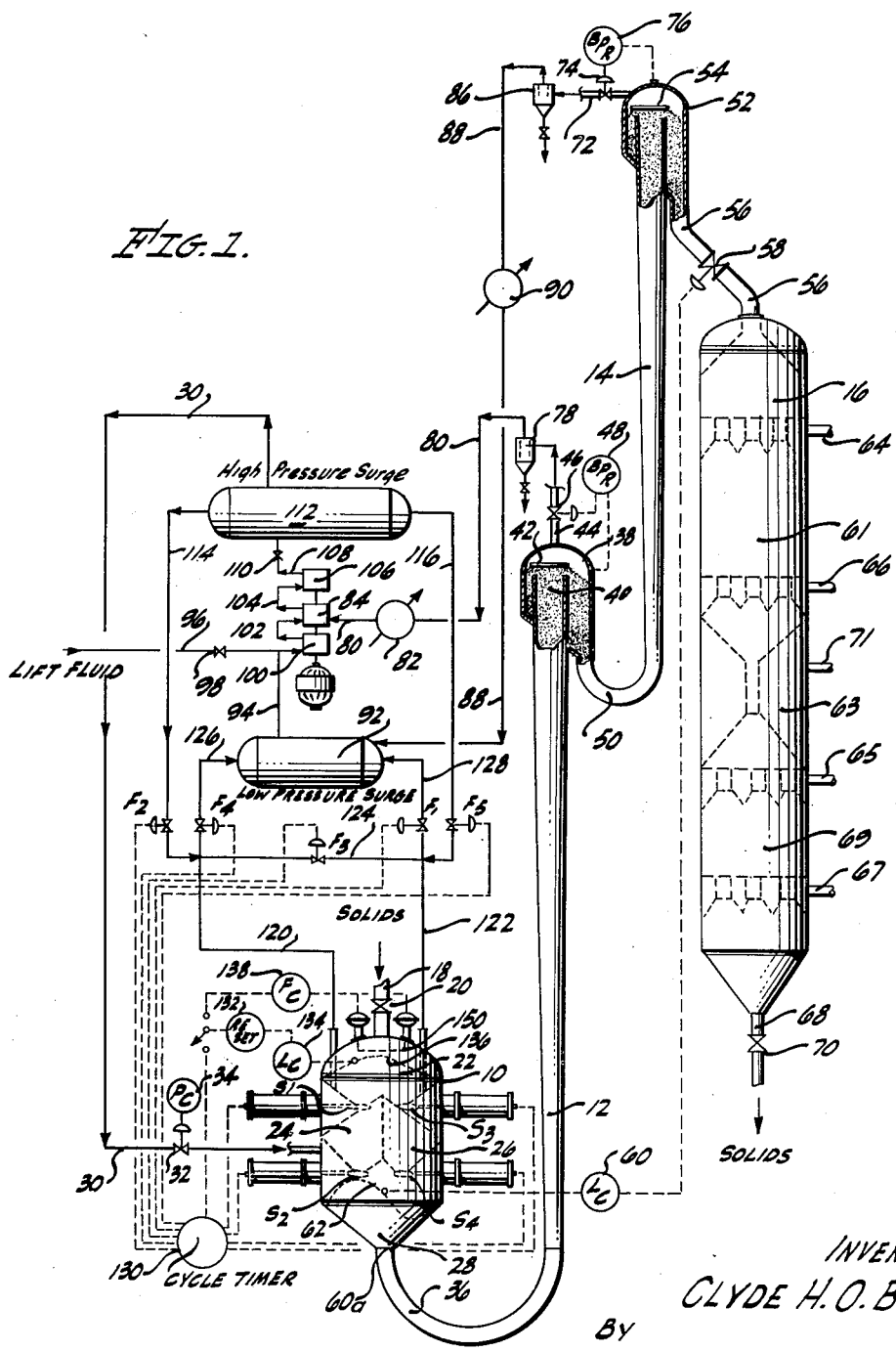
Figure 1 is a schematic flow diagram of the combination apparatus of the present invention involving the granular solids pressuring device, the conveyance conduit of the present invention and a contacting system in which granular solids may be contacted with a fluid.

Referring now more particularly to Figure 1, the principal components of the apparatus of the present invention comprise the solids pressuring vessel 10, a primary conveyance conduit 12, a secondary conveyance conduit 14 and a contacting vessel 16. Granular solids are introduced into pressuring device 10 by means of inlet conduit 18 provided with block valve 20 and solids flow control plate 150 (detailed in Figure 2) and the granular solids thus introduced flow into upper surge chamber 22. If desired, a plurality of solids inlets may be provided in place of conduit 18. By the alternate operation of upper solids block valves $S_1$ and $S_3$ the granular solids alternately flow from upper surge chamber 22 into primary and secondary pressuring chambers 24 and 26 respectively. Further, by the alternate operation of lower solids block valves $S_2$ and $S_4$ the granular solids in pressuring chambers 24 and 26 alternately flow therefrom into lower solids surge chamber 28. When two or more pressuring chambers are employed, the solids flow from the upper surge chamber directly and successively into each of the plurality of pressuring chambers, that is, the flow is first from the upper surge chamber into one pressuring chamber, then from the upper surge chamber into another pressuring chamber, and so on in succession. By removal of solids successively from each of the plurality of pressuring chambers directly into the lower surge chamber, a sequence of filling and draining the pressuring chambers is established. The use of only two pressuring chambers is hereinbelow described by way of illustration and it should be understood that two, three, four or more pressuring chambers can be so operated and is a desirable modification since a proportionate reduction in pressuring chamber volume is achieved.

A conveyance fluid under pressure is introduced via line 30 at a rate controlled by valve 32 in accordance with pressure controller 34 into lower solids surge chamber 28. The granular solids drain continuously by gravity from lower surge chamber 28 into redirection conduit 36 concurrently with the depressuring conveyance fluid flow and pass subsequently through primary conveyance conduit 12 into intermediate separator chamber 38. Both primary and secondary conveyance conduits 12 and 14 are tapered and increase in cross sectional area in the flow direction. This is required to maintain a substantially constant conveyance force ratio along the length of the line. If desired, a series of cylindrical sections of increasing diameter may be connected to approximate a constant conveyance force ratio.

Separator chamber 38 surrounds the outlet opening 40 of primary conveyance conduit 12 and receives granular solids and the concurrently depressuring conveyance fluid discharging therefrom. Thrust plate 42 is positioned between about 0.2 and 1.0 outlet diameters from the outlet opening 40 of primary conveyance conduit 12 to restrict the granular solids discharge rate therefrom. A portion of the partially depressured conveyance fluid is removed from the intermediate separating chamber 38 by means of line 44 at a rate controlled by valve 46 in accordance with back pressure regulator 48 which serves to maintain a predetermined pressure in chamber 38. This is required particularly in long conveyance conduits to reduce the fluid velocity and permit a reduction in the cross sectional area of the conduit at that point without increasing the conveyance force ratio. This partially depressured conveyance fluid is returned to the conveyance fluid compressing system subsequently described. In shorter conduits, such as from 10 to 100 feet, the gas draw-off point corresponding to chamber 38 may be eliminated. Operation at high total operating pressure relative to the pressure differential existing between the inlet and outlet of the conduit permits a smaller degree of change in conduit cross section with length and thus longer lines may be employed without fluid removal. With liquid conveyance fluids or with gaseous fluids depressuring less than about 10% of their absolute pressure, no change in area need be provided in the conveyance conduit.

The solids discharging into chamber 38 flow by gravity therefrom into secondary redirection zone 50 and flow therethrough concurrently with the remaining portion of depressuring conveyance fluid and on through secondary conveyance conduit 14 for discharge into secondary separator chamber 52. The design of this separator chamber is substantially the same as that of primary separator chamber 38 and is provided with thrust plate 54 to maintain granular solids flowing through conduit 14 in substantially compact form. The granular solids discharging into sepaartor 52 flow by gravity therefrom via transfer line 56 at a rate controlled by valve 58 in accordance with level controller 60 which in turn is actuated by the granular solids level in lower solids surge zone 28. Thus, when solids level 62 rises above a predetermined desired level, controller instrument 60 operates to open valve 58 and by withdrawing greater quantities of granular solids from secondary separator 52 a greater flow rate of granular solids is permitted through secondary conduit 14. This in turn causes a greater withdrawal of solids from primary conduit 38 permitting an increased solids flow through primary conduit 12 which is in turn reflected in a decreasing solids level 62. The reverse effect results under conditions when solids level 62 falls below the desired level and level controller instrument 60 operates to close valve 58 which ultimately reflects a rising level 62. It should be understood that control valve 58 is of the throttling type whereby flow control of the granular solids is possible and is preferably not a block or shut-off valve.

The granular solids control thus effected maintains an accumulation of granular solids in lower surge chamber 28 thereby submerging inlet opening 60a of the primary redirection zone 36 at all times. The granular solids thus discharged pass via line 56 into a contacting vessel such as 16 which may be provided with reaction zone 61 having inlets and outlets 64 and 66 and regeneration zone 69 having inlets and outlets 65 and 67 together with other inlets and outlets such as conduit 71, if required, for sealing zone 63. The contact of the granular solids such as a hydrocarbon cracking catalyst thus conveyed with a gas oil cracking stock, for example, is thus permitted. In another example, column 16 may comprise a column in which an adsorption zone and a desorption zone are provided for gas separation. In either case the granular solids removed therefrom via line 68 at a rate controlled by valve 70 may be reintroduced into the solids pressuring vessel 10 via line 18 as previously described to establish a recirculatory solids system. If such a contacting process is not contemplated, the granular solids discharged via line 56 may be stored or put to any other use as is required.

The system employed in the present invention to provide high pressure conveyance fluid is one of inherent high efficiency and optionally involves the recirculation of the partially depressured conveyance fluid removed as described from primary separator 38 and also totally depressured conveyance fluid removed from secondary separator 52 via line 72 at a rate controlled by valve 74 in accordance with back pressure regulator 76 which in turn operates to maintain a predetermined back pressure in separator 52. The partially depressured conveyance fluid is passed via line 44 into dust removal zone 78 which may comprise a cyclone or a filter or an oil or water wash. The dust-free partially depressured conveyance fluid then passes via line 80 through partially depressured conveyance fluid cooler 82 and is introduced into an interstage 84 of the conveyance fluid compressor. The totally depressured conveyance fluid is passed through dust removal zone 86 which is analogous to dust removal zone 78 and the dust-free fluid passes via line 88 through cooler 90 and is introduced into low pressure conveyance fluid surge drum 92. Low pressure conveyance fluid from surge drum 92 is removed therefrom via line 94 and is mixed with fresh or make-up conveyance fluid flowing through line 96 at a rate controlled by valve 98.

The mixture is introduced into first stage 100 of the conveyance fluid compressor. This fluid is compressed and passed via line 102 through interstage coolers and condensate separators not shown into high pressure stage 84. The compressed fluids from interstage 84 are then passed via line 104 through interstage coolers and condensate sepaartors not shown into high pressure stage 106 of the conveyance fluid compressor. The high pressure conveyance fluid then passes via line 108 through valve 110 into high pressure conveyance fluid surge drum 112. The number of compression stages is dictated by the pressure differential required and in any event when fluid re-compression is used, the depressured and make-up fluids are injected into stages having inlet pressures substantially the same as that of the fluid to be compressed.

High pressure conveyance fluid removed from high pressure surge drum 112 is removed and used to supply the high pressure conveyance fluid as previously described and introduced into lower solids surge chamber 28 of the solid pressuring device 10. High pressure fluid is also used in the pressuring of primary and secondary pressuring chambers 24 and 26 prior to draining granular solids contained in either of these chambers into the lower solids surge chamber 28. Line 30 conveys high pressure conveyance fluid controlled by valve 32 to lower surge chamber 28 in an amount sufficient to maintain the predetermined conveyance conduit inlet pressure necessary to effect compact granular solids flow through the conveyance system. High pressure conveyance fluid is also removed from high pressure surge drum 112 via line 114 and 116 for use as subsequently described in pressuring the pressuring chambers of solids pressuring device 10.

Referring now more particularly in Figure 1 to the solids pressuring device 10, the granular solids present in upper solids surge chamber 22 exist at a relatively low pressure and which may be atmospheric pressure. Lower solids surge chamber 28 exists at a relatively high pressure compared with upper solids surge chamber 22. When pressuring chambers 24 or 26 receive solids from upper surge chamber 22 they must be depressured to the same pressure as the upper surge chamber. Similarly, when the pressuring chambers are to deliver solids to the lower solids surge chamber 28 they must be pressured substantially to the same pressure as that of the lower surge chamber. To accomplish this pressuring and depressuring of the pressuring chambers 24 and 26, a specific predetermined sequence of solids flow and fluid flow valve manipulations is provided whereby a continuous introduction of granular solids into upper surge chamber 22 and a continuous discharge of solids from lower solids surge chamber 28 is permitted. The sequence is substantially as follows when two pressuring chambers are employed. When one pressuring chamber is filling with solids the other is draining; when one pressuring chamber is being pressured the other is being depressured, and these general operations are repeated successively to maintain a continuous throughput of granular solids. It should be understood that more than two pressuring chambers may be employed, such as three or four or more, by modifying the vessel and the time cycle of operation.

The pressuring and depressuring operations are effected in two steps. With the solids flow valves closed, the high pressure pressuring chamber is first opened directly via an equalizing line to the depressured pressuring chamber whereby the two chambers are brought to equal pressures. The equalizing line is then closed. Subsequently the chamber being pressured is charged with high pressure conveyance fluid to the pressure of the lower solids surge chamber while the pressuring chamber to be depressured is vented either to the atmosphere or to the low pressure surge drum to bring it to the same pressure of the upper solids surge chamber. The appropriate solids block valves are opened and the depressured pressuring chamber is filled with solids from the upper surge chamber while the pressured pressuring chamber discharges solids to the lower solids surge chamber. These operations are then repeated in a cycle.

Pressuring chamber 24 is provided with primary manifold 120 while pressuring chamber 26 is provided with secondary manifold 122. For purposes of illustration of the operating cycle it will be assumed that primary pressuring chamber 24 is pressured and has discharged granuar solids into the lower surge chamber and that secondary pressuring chamber 26 is depressured and has just received a charge of granular solids from upper surge chamber 22. Solids valves $S_2$ and $S_3$ are therefore opened. The next step in the operation is the closing of valves $S_2$ and $S_3$. Then equalizing valve $F_3$ opens communicating primary and secondary manifolds 120 and 122 with each other through equalizing line 124. Pressuring chambers 24 and 26 are thus brought to equal pressures intermediate between pressures of upper and lower solids surge chambers 22 and 28. Equalizing valve $F_3$ subsequently closes and valves $F_4$ and $F_5$ open. In this manner primary manifold 120 is opened via primary vent line 126 into the low pressure surge chamber thereby depressuring pressuring chamber 24 from the intermediate pressure to the same pressure as upper solids surge chamber 22. The opening of valve $F_5$ communicates secondary manifold 122 via secondary pressuring line 116 with high pressure surge drum 112 thereby pressuring pressuring chamber 26 from the intermediate pressure to the same pressure as lower solids surge chamber 28. During this operation valves $S_1$, $S_2$, $S_3$ and $S_4$ in pressuring device 10 remain closed as do valves $F_1$, $F_2$ and $F_3$. Next, valves $S_1$ and $S_4$ are opened and granular solids drain from upper surge chamber 22 into primary pressuring chamber 24 and from secondary pressuring chamber 26 into lower surge chamber 28. Following the filling of chamber 24 and the emptying of chamber 26 valves $S_1$ and $S_4$ are closed. Then equalizing valve $F_3$ is reopened thereby equalizing the pressure in the opposite direction from the previous equalizing step, bringing pressuring chamber 24 and 26 again to equal intermediate pressures. Equalizing valve $F_3$ is then closed and valves $F_2$ and $F_1$ are opened. Valve $F_2$ communicates primary pressuring chamber 24 via primary manifold 120 and primary pressure line 114 with high pressure surge drum 112 thereby raising the pressure therein to the same pressure as lower surge chamber 28. The opening of valve $F_1$ communicates secondary pressuring chamber 26 via secondary manifold 122 and secondary vent line 128 with low pressure surge drum 92 thus reducing the pressure in chamber 26 to the pressure of upper surge chamber 22. Valves $F_2$ and $F_1$ are then closed and valves $S_2$ and $S_3$ are opened whereby granular solids drain from primary pressuring chamber 24 into lower solids surge chamber 28 and solids drain from upper solids surge chamber 22 into secondary pressuring chamber 26. During this time solids valves $S_1$ and $S_4$ are closed, as are valves $F_1$, $F_2$, $F_3$, $F_4$ and $F_5$.

By repeating the above sequence of valve operations the continuous pressuring of low pressure solids introduced via line 18 from a low to a high pressure required for introduction into redirection zone 36 of the conveyance conduit system is achieved continuously and at high rates of flow. The above cycle is modified to provide for a plurality of more than two pressuring zones by providing each such zone with a fluid manifold having a vent line, a pressuring line and an equalizing line to depressure each such zone into another zone being pressured. Each line has an automatic valve as described above and is operable on a time cycle.

The continuous operation and control of these nine operating valves is preferably controlled automatically. Such automatic control of these variations is achieved by using a cycle timer 130 which opens and closes fluid valves $F_1$, $F_2$, $F_3$, $F_4$ and $F_5$ and solids valves $S_1$, $S_2$, $S_3$ and $S_4$ for predetermined intervals and in the order above described. The cycle timer may be set to maintain a time cycle of a predetermined length or it may be continuously re-set by re-set control instrument 132 operating in accordance with level controller 134 which in turn is actuated by fluctuations in solids level 136 in upper solids surge chamber 22.

In the first modification of operation the flow rate of granular solids into the pressuring vessel 10 is controlled in accordance with flow controller 138 which is pre-set to a predetermined flow rate of solids into the device. Therefore, level controller 134 re-sets and varies the valve cycle timer to increase or decrease the length of the time cycle to maintain a constant solids level 136 in upper solids surge chamber 22.

In another modification of control of the solids pressuring device, cycle timer 130 is pre-set to a constant cycle and re-set instrument 132 is operated to re-set and vary flow controller 138 in accordance with the variations in solids level 136 as detected by level controller 134.

Although a low pressure surge drum 92 is shown in the present operation it should be understood that this is the preferred modification when the pressure of the totally depressured conveyance fluid is substantially above atmospheric pressure, or where the conveyance fluid employed is not to be vented directly to the atmosphere because of pollution or economic considerations. When the conveyance fluid is air or flue gas and the totally depressured conveyance fluid exists at atmospheric pressure and there is otherwise no reason for reusing the conveyance fluid, the totally depressured fluid may be discharged from separator 52 directed to the atmosphere and line 126 and 128 may depressure directly to the atmosphere through valves $F_4$ and $F_1$.

The description of Figure 1 involves the circulation of solids through a single column containing contacting zones such as catalyst contacting and regeneration zones. It is to be understood that column 16 may contain only one zone, such as a reaction zone for example, of a continuous system requiring two or more zones. Solids removed from this column are therefore introduced into another conveyance system analogous to that shown for conveyance into another column containing a catalyst regeneration zone, for example. Solids removed therefrom are introduced into pressuring device 10 as described for reintroduction into column 16.

In circumstances where solids are to be conveyed greater or shorter distances, more or fewer sections may be employed in the conveyance conduit. If desired, a single section corresponding to primary conduit 12 may be used for short conveyances whereas two (as shown) or three or more serially connected conduit sections may be employed with provisions for drawing off partially depressured conveyance fluid from intermediate fluid draw-off vessels or fluid separators equivalent to primary separator 38 of Figure 1. Thus, a substantially constant conveyance force ratio is maintained in lines of increasing cross sectional area without the requirement of unduly large diameter conduits.

Figure 2:
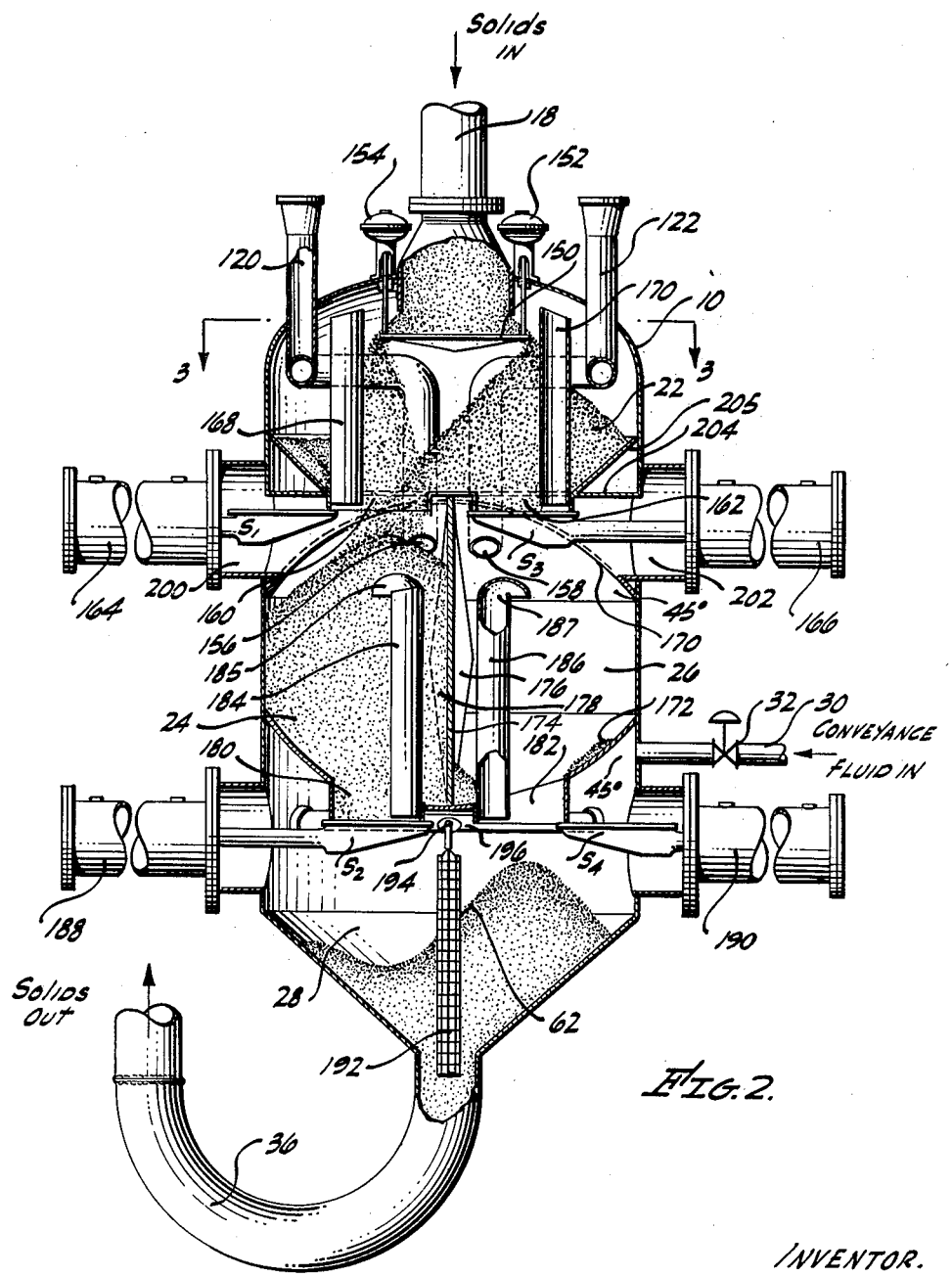
Figure 2 shows an elevation view in cross section in detail of the solids pressuring device of the present invention.

Referring now more particularly to Figure 2, an elevation view in cross section of the granular solids pressuring device is shown in detail. Elements of this device also shown in Figure 1 are here indicated by the same numbers. As before, the pressuring device consists of vessel 10 provided with upper solids surge chamber 22, primary pressuring chamber 24, secondary pressuring chamber 26 and lower solids surge chamber 28. Granular solids are introduced into the upper surge chamber 22 via line 18 directly onto movable solids flow control plate 150. This plate is raised and lowered to decrease or increase the solids inlet rate by means of automatic valve head works 152 and 154 operating in accordance with flow control instrument 138 shown in Figure 1. Pressuring and vent lines 120 and 122 are shown which enter the primary and secondary pressuring chambers 24 and 26 in openings 156 and 158, respectively. Solids inlets 160 and 162 depending from floor plate 204 are provided for removal of granular solids from chamber 22. Sloping baffle 205 is provided to maintain solids in chamber 22 in a position from which gravity flow through inlets 160 and 162 is possible. Slide valves $S_1$ and $S_3$ are actuated by pneumatic cylinders 164 and 166, respectively to open and close valves $S_1$ and $S_3$ at the proper time in response to the cycle timer. Gas risers 168 and 170 are provided respectively within solids inlets 160 and 162 to provide for the flow of enough gas to equalize any small differences in pressure between upper solids surge chamber 22 and the respective pressuring chambers 24 and 26 so that such gas flow will not interefere with gravity solids flow.

Pressuring chambers 24 and 26 are provided with hemispherical heads 170 and 172 which make an angle at their peripheries of about 45° with the vertical walls of vessel 10 thereby minimizing the dead gas space within the pressuring chambers. The chambers are separated from each other by ribbed septum 174 provided with a plurality of vertical strengthening ribs 176 and 178 so that the septum corresponds to a plurality of T beams side-by-side with ribs on either side. Solids outlets 180 and 182 are provided respectively dependent from pressuring chambers 24 and 26. A second pair of gas risers 184 and 186 having caps 185 and 187 are provided for the equalization of small differences in pressure existing between the lower solids surge chamber 28 and either of the pressuring chambers 24 or 26 again to prevent gas flow interference with solids flow. Engaging with these solids outlets 180 and 182 are slide valves $S_2$ and $S_4$ respectively actuated by pneumatic cylinders 188 and 190 in accordance with the cycle timer previously indicated.

Line 30 controlled by valve 32 is also shown whereby high pressure conveyance fluid is introduced into any convenient portion of lower surge chamber 28. Grid work 192 extends downwardly through solids level 62 to detect changes in position of the solids level and to actuate level control instrument 60 shown in Figure 1. This grid work depends from a horizontal bar 194 which is attached at right angles to a tube not shown but capable of supporting a torsion stress and contained in torsion tube housing 196. The downward motion of granular solids around grid work 192 places a greater or lesser load on the torsion tube as the level is higher or lower, respectively. This torsional movement is employed to actuate level controller 60 in the manner described.

The slide valves $S_1$, $S_2$, $S_3$ and $S_4$ all are adapted to seal tightly the openings of solids inlets and outlets 160, 162, 180 and 182 when a pressure in the upward direction is applied, as only occurs in this system when the valves are closed.

The opening through the upper hemispherical head 170 through which solids inlets 160 and 162 discharge and through which slide valve $S_1$ and $S_3$ operate is clearly shown in Figure 3 and comprises an opening described by the intersection of the lower half of cylindrical manholes 200 and 202 with the hemispherical head 170. Outlets 160 and 162 depend from horizontal floor plate 204 positioned just above the crown of upper hemispherical head 170.

Referring now more particularly to Figure 3, a plan view in cross section is shown of the upper solids surge chamber 22 of pressure vessel 10 shown in Figures 1 and 2. In Figure 3 vessel 10 is shown along with septum 176 and manholes 200 and 202 through which valves $S_1$ and $S_3$ operate respectively. The dotted line 205 shown is the intersection of the cylindrical extension of manholes 200 and 202 with the upper hemispherical head 170 shown in Figure 1. Downwardly through this opening extend solids inlets 160 and 162 provided with gas risers 168 and 170 respectively. Pressuring and vent lines 120 and 122 are also shown in this figure. In this figure the manifolds 210 and 212 discharge into pressuring chambers 24 and 26 via openings 156 and 158 respectively and also in openings 214 and 216 respectively are shown. If desired, a suitable modification may be made whereby lines 120 and 122 pass through the side of pressure vessel 10 instead of through surge chamber 22 and terminate directly in openings 156 and 158 wherein openings 214 and 216 are eliminated.

Referring now more particularly to Figure 4, an illustration of the operating sequence of the solids and fluid valves is given. The key to the crosshatching in the horizontal lines is given wherein crosshatching consisting of diagonal lines rising to the right indicate a period in which the particular valve is opening. The uncrosshatched portions indicate the period in which the particular valve is open. Crosshatching consisting of lines descending to the right indicate the period during which the closing of a valve occurs and the solid lines indicate the period when the valve is closed. Passing from left to right along the length of the lines opposite the designation of each valve indicates the passage of time and the vertical intersecting the horizontal lines referred to are indications of equal time. At the bottom of the sketch are indicated the general operations taking place during the succeeding intervals. While the primary pressure chamber is filling, the secondary pressure chamber is emptying; while pressuring chamber 24 is pressuring, secondary pressure chamber 26 is depressuring, etc. More than one complete cycle is shown and the cycle is repeated successively during operation.

To illustrate the construction and operation of the solids pressuring device of the present invention as well as its combination with the conveyance conduit described, the following data are given. The particular apparatus described below is designed to pressure 500 tons per hour of bead cracking catalyst from a pressure of 0.3 lb./sq. in. gauge to a pressure of 80.3 lbs./sq. in. gauge into the conveyance conduit described below. The pressure vessel overall is about 20 feet high and about 9 feet in diameter. The main inlets and outlets for granular solids are 24 inches in diameter. The solids inlets discharging solids from the upper surge chamber and from the primary and secondary pressuring chambers are placed on 36-inch centers and are 24 inches in diameter. The radius of curvature of the hemispherical heads is 5 feet. The manholes through which the solids valves $S_1$, $S_2$, $S_3$, and $S_4$ operate are 30 inches in diameter. The gas riser lines are 8-inch schedule 40 pipe. The septum dividing the primary and secondary pressuring chambers is 1¼-inch mild steel plate provided with 1-inch thick thick vertical stiffeners spaced 8 inches apart, the center stiffener having a maximum width of 12.5 inches measured along a perpendicular to the septum plane. The maximum height from the crown of the upper hemispherical head to the lowest point of the lower hemispherical head is about 5 feet. The volumetric capacity of the upper solids surge chamber is about 65 cubic feet. The volume of each of the primary and secondary pressuring chambers is 87 cubic feet and the volume of the lower solids surge chamber is 65 cubic feet. The length of the time cycle is 28 seconds.

The solids pressuring device described above is designed to handle granular solids at a temperature 950° F. and is well adapted for the pressuring of cracking catalyst removed from a catalyst regenerator at substantially that temperature. The conveyance conduit employed in the conveyance of this quantity of granular solids is described below.

The pressuring vessel is provided with a 180° redirection conduit, decreasing in diameter from 24 inches to 12 inches at the point of connection to the conveyance conduit. The primary and secondary sections of the conveyance conduit are tapered, having a 12-inch diameter inlet and 21.3-inch diameter outlet and are 120 and 60 feet in length, respectively. The conveyance fluid is compressed air introduced into lower solids surge chamber at 80.3 pounds per square inch gauge and at a rate of about 1390 s. c. f. m. (standard cubic feet per minute) which includes 414 s. c. f. m. of partially depressured conveyance fluid removed from the discharge end of the primary section of the conveyance conduit.

The granular cracking catalyst circulation rate is sufficient to treat 15,000 barrels (42 U. S. gallons/barrel) per day of straight run and cracked California gas oil at a temperature of 835° F. and a catalyst to oil ratio of 5.16 in a reaction zone operated at 10 pounds per square inch gauge. A gasoline production (debutanized and 400° F. end point) of 5,100 barrels per day is obtained.

The horsepower requirement for conveyance of the solids is 24% of that required for so-called "gas lift" or suspension systems and considerably less than that required with bucket elevators.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressure, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example a given mass of uniform spherical granules will have the least bulk density when systematically packed with particle centers coinciding with the corners of a cube (cubic packing-pore volume 47.64% [1]) and the greatest bulk density (about 41.5% greater) when uniformly packed with particle centers coinciding with the apexes of a tetrahedron (rhombohedral packing-pore volume 25.95% [1]). The bulk density of solids during conveyance according to this invention is intermediate between the bulk densities of solids uniformly packed according to the foregoing systems and is apparently a random mixture of several packing geometries. Similar density variations occur in packings of nonuniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25 |
| Conduit attitude | Vertical |
| Conduit diameter, inches: | |
| Inlet | 3.068 |
| Outlet | 4.000 |
| Conveyance fluid | Air |
| Solids mesh size | 4–10 |
| Solids flow rate, lb./hr | 4,500 |
| Solids vibrational bulk density, lb./cu. ft | 46.7 |

Upon depressuring the conveyance fluid from the bottom of the conduit while preventing further introduction of solids thereinto, it was noted that the solids level dropped only 0.25 foot from the solids outlet at the top of the 27.25 foot line indicating an operating solids bulk density of 46.3 pounds per cubic foot during conveyance. This is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient, or as a check determination, the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example, in a 140-foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140-foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly, in aerated or so-called "fluidized" systems the pressure differential decreases with increase in gas velocity. Thus, it is seen that the magnitude of the pressure differential is on the order of 50 times greater in conveyance of compact solids than in dilute suspension and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\frac{dp}{dl}}{\rho_s \cos \theta}$$

(the terms of which are given elsewhere herein). Except in relatively rare cases when the operating bulk density is decreased by an amount approaching 20% of the vibrational bulk density $\rho_s$ due to packing rearrangements of the compact solids and the ratio thus determined may be as low as 0.8, the conveyance force ratio as thus calculated exceeds 1.0 for convenience of substantially compact solids whereas in a conduit carrying an aerated suspension a very considerably lower value of $$\frac{dp}{dl}$$

and a conveyance force ratio well below 1.0 based on the vibrational bulk density is found. Both compact and aerated solids may exist in the same conduit and is a desirable operation in such processes as contact coking wherein the solids increase the size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in the directions included in the solid angle defined above, but it is also applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the conveyance of granular solids which comprises flowing solids to be conveyed into an upper solids surge zone, flowing solids by gravity from said upper surge zone directly and in rotation into each of a plurality of pressuring zones, flowing solids by gravity from each of said plurality of pressuring zones in rotation directly into a lower surge zone, maintaining said lower surge zone at a higher pressure than said upper surge zone, successively depressuring each of said

---

[1] Micromeritics, J. M. Dalla Valle (1943), p. 105.

pressuring zones to the upper surge zone pressure prior to receiving solids therefrom and pressuring each of said pressuring zones to the lower surge zone pressure prior to discharging solids thereinto according to a predetermined time cycle to maintain a relatively continuous removal of solids from said upper surge zone and a relatively continuous discharge of solids into said lower surge zone, flowing granular solids from said lower surge zone at a high pressure relative to said upper surge zone, detecting the variation in position of a solids level within said upper surge zone, varying the flow rate of granular solids through said zones in accordance with the variations in said solids level to maintain said solids level at a substantially constant position, maintaining said lower surge zone at a hgher pressure than said upper surge zone by introducing a conveyance fluid thereinto under pressure, depressuring said conveyance fluid concurrently with a continuous moving porous mass of said granular solids in substantially compact form from said lower surge zone through an elongated conveyance zone, controllably restricting the discharge of granular solids therefrom to maintain said solids during conveyance in substantially compact form, detecting variations in the solids level in said lower surge zone, and varying the discharge of solids from said conveyance zone in accordance with said solids level in said lower surge zone to maintain said level at a substantially constant position.

2. A process for the conveyance of granular solids which comprises flowing solids to be conveyed into an upper solids surge zone, flowing solids by gravity from said upper surge zone directly and in rotation into each of a plurality of pressuring zones, flowing solids by gravity from each of said plurality of pressuring zones in rotation directly into a lower surge zone, maintaining said lower surge zone at a higher pressure than said upper surge zone, successively depressuring each of said pressuring zones to the upper surge zone pressure prior to receiving solids therefrom and pressuring each of said pressuring zones to the lower surge zone pressure prior to discharging solids thereinto according to a predetermined time cycle to maintain a relatively continuous removal of solids from said upper surge zone and a relatively continuous discharge of solids into said lower surge zone, flowing granular solids from said lower surge zone at a high pressure relative to said upper surge zone, detecting the variation in position of a solids level within said upper surge zone, varying the flow rate of granular solids through said zones in accordance with the variations in said solids level to maintain said solids level at a substantially constant position, introducing a conveyance fluid under pressure into said lower surge zone to maintain a higher pressure therein relative to said upper surge zone, depressuring said conveyance fluid concurrently with a continuous moving porous mass of said granular solids in substantially compact form from said lower surge zone through an elongated conveyance zone, having at least one intermediate fluid draw-off zone between its ends, withdrawing a stream of partially depressured conveyance fluid from each of said draw-off zones thereby maintaining a predetermined fluid pressure in each of said draw-off zones, restricting the discharge of granular solids from the outlet of said conveyance zone to maintain solids therein in substantially compact form, detecting variations in the level of accumulated solids within said lower solids surge zone, and varying the discharge of solids from said conveyance zone in accordance with said variations to maintain said level of accumulated solids in said lower surge zone at a substantially stationary position.

3. A process according to claim 2 in combination with the steps of passing the conveyed solids into a fluid-solids contacting column and therein successively through contacting zones, passing fluids to be contacted through said contacting zones, and flowing solids from said column into said upper surge zone.

4. A process according to claim 2 in combination with the steps of compressing said depressured conveyance fluid removed from the outlet of said conveyance zone and said partially depressured conveyance fluid removed from said intermediate draw-off zones to a pressure substantially equal to that of said lower surge zone, passing part of the thus compressed fluid into said lower surge zone as said conveyance fluid, and introducing the remaining part into said pressuring zones during the pressuring portion of the time cycle to increase the pressure therein to the pressure of said lower surge zone.

5. A process for the conveyance of granular solids which comprises flowing solids to be conveyed into an upper solids surge zone, flowing solids by gravity from said upper surge zone directly and in rotation into each of a plurality of pressuring zones, flowing solids by gravity from each of said plurality of pressuring zones in rotation directly into a lower surge zone, maintaining said lower surge zone at a higher pressure than said upper surge zone, successively depressuring each of said pressuring zones to the upper surge zone pressure prior to receiving solids therefrom and pressuring each of said pressuring zones to the lower surge zone pressure prior to discharging solids thereinto according to a predetermined time cycle to maintain a relatively continuous removal of solids from said upper surge zone and a relatively continuous discharge of solids into said lower surge zone, flowing granular solids from said lower surge zone at a high pressure relative to said upper surge zone, detecting the variation in position of a solids level within said upper surge zone, and varying the flow rate of granular solids through said zones in accordance with the variations in said solids level to maintain said solids level at a substantially constant position.

6. A process for the conveyance of granular solids which comprises flowing solids to be conveyed into an upper solids surge zone, flowing solids by gravity from said upper surge zone directly and in rotation into each of a plurality of pressuring zones, flowing solids by gravity from each of said plurality of pressuring zones in rotation directly into a lower surge zone, maintaining said lower surge zone at a higher pressure than said upper surge zone, successively depressuring each of said pressuring zones to the upper surge zone pressure prior to receiving solids therefrom and pressuring each of said pressuring zones to the lower surge zone pressure prior to discharging solids thereinto according to a predetermined time cycle to maintain a relatively continuous removal of solids from said upper surge zone and a relatively continuous discharge of solids into said lower surge zone, flowing granular solids from said lower surge zone at a high pressure relative to said upper surge zone, detecting the variation in position of a solids level within said upper surge zone, repeating the operations of filling, draining, pressuring and depressuring of said plurality of pressuring zones in accordance with a predetermined time cycle, and controlling the rate of solids flow into said upper surge zone in accordance with the variations of said solids level to maintain a substantially unchanging solids level therein.

7. A process for the conveyance of granular solids which comprises flowing solids to be conveyed into an upper solids surge zone, flowing solids by gravity from said upper surge zone directly and in rotation into each of a plurality of pressuring zones, flowing solids by gravity from each of said plurality of pressuring zones in rotation directly into a lower surge zone, maintaining said lower surge zone at a higher pressure than said upper surge zone, successively depressuring each of said pressuring zones to the upper surge zone pressure prior to receiving solids therefrom and pressuring each of said pressuring zones to the lower surge zone pressure prior to discharging solids thereinto according to a predetermined time cycle to maintain a relatively continuous removal of solids from said upper surge zone and a relatively continuous discharge of solids into said lower surge zone, flowing granular solids from said lower surge zone at a high pressure relative to said upper surge zone, maintaining a constant predetermined flow rate of solids into said upper surge zone, repeating the operations of filling, draining, pressuring and depressuring said plurality of pressuring zones in accordance with said time cycle, detecting the variation in position of the level of solids within said upper surge zone, and controlling the length of said time cycle in accordance with the variations in said solids level to maintain a substantially constant solids level therein.

8. An apparatus for the conveyance of granular solids which comprises a solids pressuring vessel provided therein with an upper solids surge chamber, a lower solids surge chamber and a plurality of pressuring chambers therebetween, at least one inlet conduit for solids into said upper solids surge chamber, a valved inlet for solids from said upper solids surge chamber into each of said pressuring chambers, a valved outlet for solids from each of said pressuring chambers into said lower solids surge chamber, an inlet conduit for conveyance fluid under pressure into said lower solids surge chamber, a plurality of manifold conduits one opening into each of said pressuring chambers for introduction and removal of fluids, an outlet conduit for solids from said lower solids surge chamber communicating with an elongated conveyance conduit, a fluid-solids separator chamber surrounding the discharge opening of said conveyance conduit, an outlet conduit from said separator chamber for removal of depressured conveyance fluid, means for restricting the discharge of solids into said separator chamber from said conveyance conduit without substantial restriction of the discharge therefrom of conveyance fluid, and an outlet conduit provided with a solids flow control valve for solids flowing from said separator chamber.

9. An apparatus according to claim 8 in combination with means for detecting the position of the solids level in said lower solids surge chamber, and a level controller instrument actuated by said means and adapted to operate said solids flow control valve to increase the opening thereof in response to a high solids level and decrease the opening thereof in response to a low solids level in said lower solids surge chamber.

10. An apparatus according to claim 8 in combination with a separate motive means connected to and adapted to actuate each of said valved inlets and outlets for solids to and from said pressuring chambers, said motive means being responsive to said cycle timer instrument whereby said inlets and outlets are opened and closed in sequence to charge and discharge solids to and from each of said pressuring vessels in succession and whereby solids are removed from said upper solids surge chamber and introduced into said lower solids surge chamber at substantially constant rates.

11. An apparatus according to claim 10 wherein said motive means are pneumatic cylinders.

12. An apparatus for the conveyance of granular solids which comprises a solids pressuring vessel provided therein with an upper solids surge chamber, a lower solids surge chamber and a plurality of pressuring chambers therebetween, at least one inlet conduit for solids into said upper solids surge chamber, a valved inlet for solids from said upper solids surge chamber into each of said pressuring chambers, a valved outlet for solids from each of said pressuring chambers into said lower solids surge chamber, an inlet conduit for conveyance fluid under pressure into said lower solids surge chamber, a plurality of manifold conduits one opening into each of said pressuring chambers for introduction and removal of fluids, an outlet conduit for solids from said lower solids surge chamber communicating with an elongated conveyance conduit, said conveyance conduit being provided with at least one intermediate fluid draw-off vessel along the length of said conveyance conduit, an outlet conduit from said draw-off vessel for partially depressured conveyance fluid, means for controlling the flow of said partially depressured conveyance fluid from said draw-off vessel to maintain a predetermined fluid pressure therein, a fluid-solids separator chamber surrounding the discharge opening of said conveyance conduit, an outlet conduit from said separator chamber for removal of depressured conveyance fluid, means for restricting the discharge of solids into said separator chamber from said conveyance conduit without substantial restriction of the discharge therefrom of conveyance fluid, and an outlet conduit for solids from said separator chamber.

13. An apparatus for the conveyance of granular solids which comprises a solids pressuring vessel provided therein with an upper solids surge chamber, a lower solids surge chamber and a plurality of pressuring chambers therebetween, at least one inlet conduit for solids into said upper solids surge chamber, a valved inlet for solids from said upper solids surge chamber into each of said pressuring chambers, a valved outlet for solids from each of said pressuring chambers into said lower solids surge chamber, an inlet conduit for conveyance fluid under pressure into said lower solids surge chamber, a plurality of manifold conduits one opening into each of said pressuring chambers for introduction and removal of fluids, an outlet conduit for solids from said lower solids surge chamber communicating with an elongated conveyance conduit, said conveyance conduit consisting of a plurality of serially communicating conduits provided with an intermediate fluid draw-off chamber at each point of communication, an outlet conduit for partially depressured conveyance fluid from each of said draw-off chambers, a back pressure regulator in each of said outlet conduits, a fluid-solids separator chamber surrounding the solids discharge opening of said conveyance conduit, means in said separator chamber for restricting the discharge of solids thereinto from said conveyance conduit without substantial restriction of conveyance fluid flow, an outlet conduit from said separator chamber for depressured conveyance fluid, an outlet conduit therefrom for conveyed solids, a solids flow control valve in said latter conduit, and means for adjusting said flow control valve to maintain a substantially constant solids level within said lower solids surge chamber.

14. An apparatus according to claim 13 in combination with fluid compression means connected to receive partially depressured conveyance fluid from said intermediate draw-off vessels, a high pressure conveyance fluid surge drum in fluid-receiving relation to the discharge outlet of said fluid compression means, a high pressure conveyance fluid conduit connecting said surge drum with said lower solids surge chamber, and a plurality of valved pressuring conduits communicating said high pressure surge drum with each of said plurality of pressuring chambers within said solids pressuring vessel via said manifold conduits.

15. An apparatus according to claim 14 in combination with a low pressure fluid surge drum, a conduit communicating said drum with said fluid compression means, and a plurality of valved vent conduits communicating said low pressure surge drum with each of said manifold conduits.

16. An apparatus for the conveyance of granular solids which comprises a solids pressuring vessel provided therein with an upper solids surge chamber, a lower solids surge chamber and a plurality of pressuring chambers therebetween, at least one inlet conduit for solids into said upper solids surge chamber, a valved inlet for solids from said upper solids surge chamber into each of said pressuring chambers, a valved outlet for solids from each of said pressuring chambers into said lower solids surge chamber, an inlet conduit for conveyance fluid under pressure into said lower solids surge chamber, a plurality of manifold conduits one opening into each of said pressuring chambers for introduction and removal of fluids, an outlet conduit for solids from said lower solids surge chamber communicating with an elongated conveyance conduit, a fluid-solids separator chamber surrounding the discharge opening of said conveyance conduit, an outlet conduit from said separator chamber for removal of depresured conveyance fluid, means for restricting the discharge of solids into said separator chamber from said conveyance conduit without substantial restriction of the discharge therefrom of conveyance fluid, a valved outlet for conveyed solids from said separator chamber, a level controller instrument adapted to vary the solids flow rate through said valved outlet from said separator chamber in accordance with fluctuations in the solids level within said lower solids surge chamber, a flow controller instrument adapted to actuate solids flow control means in said solids inlet conduit into said upper solids surge chamber, a cycle timer instrument adapted to actuate said valved inlet and outlet for solids opening into each of said plurality of pressuring chambers, another level controller instrument actuated by the solids level in said upper solids surge chamber, and an instrument re-setting means adapted to vary the solids flow rate through said pressuring vessel to maintain a substantially constant level of solids in said upper solids surge chamber.

17. An apparatus according to claim 16 wherein said instrument resetting means is adapted to reset said cycle timer instrument and thereby vary the length of the time cycle to maintain a substantially constant solids level in said upper solids surge chamber.

18. An apparatus according to claim 16 wherein said instrument resetting means is adapted to reset said flow controlled instrument to maintain a substantially constant solids level in said upper solids surge chamber.

19. An apparatus for the conveyance of granular solids which comprises a solids pressuring vessel containing therein an upper solids surge chamber, at least one inlet conduit thereinto for solids to be conveyed, solids flow control means associated with each such inlet conduit, a plurality of solids pressuring chambers situated immediately below said upper solids surge chamber and within said pressuring vessel, a valved inlet for solids opening from said upper solids surge chamber into each of said plurality of pressuring chambers, a valved outlet for solids, opening from each of said plurality of pressuring chambers into a lower solids surge chamber situated in the bottom of said solids pressuring vessel, a fluid manifold opening into each of said pressuring chambers, each such manifold being provided with a valved vent conduit and a valved pressuring conduit, said pressuring conduits each communicating with a high pressure conveyance fluid surge drum, a conduit communicating said fluid surge drum with said lower solids surge chamber, an elongated conveyance conduit in solids-receiving relation to said lower solids surge chamber, a fluid-solids separator chamber in solids receiving relation to and surrounding the discharge opening of said conveyance conduit, means for applying a flow restrictive force to solids issuing from said conveyance conduit, an outlet for depressured conveyance fluid from said separator chamber, at least one fluid draw-off vessel along the length of said conveyance conduit, an outlet therefrom for partially depressured conveyance fluid, a fluid compressor, an inlet conduit thereto for fluid from said draw-off vessel, an outlet conduit therefrom communicating with said surge drum, and a cycle timer instrument adapted to actuate said valved inlets and outlets for solids and said valved pressuring and vent conduits associated with said plurality of pressuring chambers to effect the successive filling, pressuring, emptying and depressuring of each of said plurality of pressuring chambers in a predetermined sequence.

20. An apparatus for the conveyance of granular solids which comprises a solids pressuring vessel containing therein an upper solids surge chamber, at least one inlet conduit thereinto for solids to be conveyed, solids flow control means associated with each such inlet conduit, a primary and a secondary solids pressuring chamber situated immediately below said upper solids surge chamber within said pressuring vessel, a primary inlet having a valve ($S_1$) and a secondary inlet having a valve ($S_3$) for solids communicating said upper solids surge chamber and said primary and secondary pressuring chambers respectively, a primary outlet having a valve ($S_2$) and a secondary outlet having a valve ($S_4$) for solids communicating said primary and secondary pressuring chambers respectively with a lower solids surge chamber disposed at the bottom of said pressuring vessel, a primary and a secondary fluid manifold communicating respectively with said primary and secondary pressuring chambers, an equalizing conduit provided with a valve ($F_3$) opening into said manifolds, said primary and secondary manifolds also communicating respectively via a primary pressure conduit provided with a valve ($F_2$) and via a secondary pressure conduit provided with a valve ($F_5$) with a high pressure fluid surge drum, said primary and secondary manifolds being provided respectively with a primary vent conduit provided with a valve ($F_4$) and a secondary vent conduit provided with a valve ($F_1$), said valves ($S_1$), ($S_2$), ($S_3$), ($S_4$), ($F_1$), ($F_2$), ($F_3$), ($F_4$) and ($F_5$) being actuated in accordance with a cycle timer instrument, said instrument being adapted to open and close said valves in sequence whereby each pressuring chamber is successively charged with solids, partially pressured by communication with the other pressuring chamber thereby equalizing the pressures thereof, pressured to the pressure of said lower solids surge chamber, discharged of solids, partially depressured by communication with the other pressuring chamber, depressured to the pressure of the upper solids surge chamber and then recharged with solids in alternation with the other pressuring chamber whereby solids are removed from said upper solids surge chamber and introduced into said lower solids surge chamber at substantially constant rates, a conduit communicating said fluid surge drum with said lower solids surge chamber, an elongated conveyance conduit in solids-receiving relation to said lower solids surge chamber, a fluid-solids separator chamber in solids-receiving relation to and surrounding the discharge opening of said conveyance conduit, means for applying a flow restrictive force to solids issuing from said conveyance conduit, an outlet for depressured conveyance fluid from said separator chamber, at least one fluid draw-off vessel along the length of said conveyance conduit, and an outlet therefrom for partially depressured conveyance fluid.

21. An apparatus for the conveyance of granular solids which comprises a solids pressuring vessel provided therein with an upper solids surge chamber, a lower solids surge chamber and a plurality of pressuring chambers therebetween, said solids surge chambers being separated from said pressuring chambers within said solids pressuring vessel by pressure resistant walls integrally attached to the inner walls of said pressuring vessels, said pressuring chambers being separated from one another between said surge chambers by additional pressure resistant walls integrally attached to the inner walls of said pressuring vessel and to said first-named pressure resistant walls, at least one inlet conduit for solids into said upper solids surge chamber, a valved inlet for solids from said upper solids surge chamber into each of said pressuring chambers, a valved outlet for solids from each of said pressuring chambers into said lower solids surge chamber, a conduit for fluid communicating with said lower solids surge chamber and adapted to maintain said lower solids surge chamber at a substantially different pressure relative to said upper solids surge chamber, a plurality of manifold conduits one opening into each of said pressuring chambers above the solids level therein for introduction and removal of fluids, and an outlet conduit for solids from said lower solids surge chamber.

22. An apparatus according to claim 21 in combination with a cycle timer instrument adapted to actuate said valved inlets for solids into said pressuring chambers and said valved outlets for solids therefrom in a predetermined sequence whereby a substantially continuous withdrawal of solids from said upper solids surge chamber and a substantially continuous introduction of solids into said lower solids surge chamber occurs.

23. An apparatus according to claim 21 in combination with an upper hemispherical head concave upward with its periphery integrally attached to the inner walls of said solids pressuring vessel at a level therein below said upper solids surge chamber, a lower hemispherical head concave downward with its periphery integrally attached to the inner walls of said pressuring vessel at a level therein below and spaced apart from said upper head, a vertical septum plate integrally attached at its edges to the inner walls of said pressuring vessel and to the lower and upper surfaces of said upper and lower heads respectively to form therebetween a primary and a secondary solids pressuring chamber, said septum being provided with a plurality of strengthening ribs across its surfaces.

24. An apparatus according to claim 21 wherein each of said valved inlets and valved outlets is provided with a mechanically actuated slide valve, said cycle timer instrument being connected to and adapted to actuate said slide valves in succession whereby said primary and secondary solids pressuring chambers are each successively charged with solids, pressured, discharged of solids and depressured in alternation.

25. An apparatus according to claim 24 in combination with a pneumatic cylinder integrally attached to each of said slide valves, said cylinders being responsive to said cycle timer instrument.

26. An apparatus according to claim 21 in combination with a gas riser conduit disposed within each of said pressuring chambers, each of said conduits being open at both ends and having its lower open end disposed adjacent said valved outlet for solids from said pressuring chamber and its upper open end in the upper portion thereof to equalize small differences in pressure and to prevent gas flow interference with solids flow therefrom.

27. An apparatus according to claim 21 in combination with a gas riser conduit disposed within said upper surge chamber above each of said valved inlets for solids opening therefrom into said pressuring chambers, each of said conduits being open at both ends and having the lower opening disposed immediately above said valved outlet and their upper opening in the upper portion of said upper surge chamber to equalize small differences in pressure and to prevent gas flow interference with solids flow therefrom.

28. An apparatus for the conveyance of granular solids which comprises a solids pressuring vessel containing therein an upper solids surge chamber, at least one inlet conduit thereinto for solids to be conveyed, solids flow control means associated with each such inlet conduit, a primary and a secondary solids pressuring chamber situated immediately below said upper solids surge chamber within said pressuring vessel, a primary inlet having a valve ($S_1$) and a secondary inlet having a valve ($S_3$) for solids communicating said upper solids surge chamber and said primary and secondary pressuring chambers respectively, a primary outlet having a valve ($S_2$) and a secondary outlet having a valve ($S_4$) for solids communicating said primary and secondary pressuring chambers respectively with a lower solids surge chamber disposed at the bottom of said pressuring vessel, a primary and a secondary fluid manifold communicating respectively with said primary and secondary pressuring chambers, an equalizing conduit provided with a valve ($F_3$) opening into said manifolds, said primary and secondary manifolds also communicating respectively via a primary pressure conduit provided with a valve ($F_2$) and via a secondary pressure conduit provided with a valve ($F_5$) with a high pressure fluid surge drum, said primary and secondary manifolds being provided respectively with a primary vent conduit provided with a valve ($F_4$) and a secondary vent conduit provided with a valve ($F_1$), said valves ($S_1$), ($S_2$), ($S_3$), ($S_4$), ($F_1$), ($F_2$), ($F_3$), ($F_4$) and ($F_5$) being actuated in accordance with a cycle timer instrument, said instrument being adapted to open and close said valves in sequence whereby each pressuring chamber is successively charged with solids, partially pressured by communication with the other pressuring chamber thereby equalizing the pressures hereof, pressured to the pressure of said lower solids surge chamber, discharged of solids, partially depressured by communication with the other pressuring chamber, depressured to the pressure of the upper solids surge chamber and then recharged with solids in alternation with the other pressuring chamber whereby solids are removed from said upper solids surge chamber and introduced into said lower solids surge chamber at substantially constant rates, and an outlet for granular solids from said lower solids surge chamber.

29. An apparatus according to claim 28 wherein said primary and secondary solids pressuring chambers comprise an upper hemispherical head concave upward, a lower hemispherical head concave downward forming a spheroidal space therebetween, a vertical septum dividing said spheroidal space into said primary and secondary pressuring chambers of substantially equal volumes, two gas riser conduits open at both ends, one each extending from a point just above said valves ($S_2$ and $S_4$) to a point below said primary and secondary solids inlet conduits, and two more gas riser conduits open at both ends, one each extending from a point just above said valves ($S_1$ and $S_3$) of said primary and secondary solids inlet conduits to points adjacent the top of said upper solids surge chamber.

30. An apparatus according to claim 28 wherein said solids flow control means comprises a movable transverse plate spaced adjacent below each of said inlet conduits for solids into said upper solids surge chamber, in combination with a control instrument adapted to actuate said movable plate, and a solids level control instrument adapted to detect changes in solids level in said upper surge chamber and to re-set said control instrument to maintain a substantially constant solids level in said upper solids surge zone.

31. An apparatus according to claim 28 wherein said solids flow control means comprises a movable transverse plate spaced adjacent below each of said inlet conduits for solids into said upper solids surge chamber, in combination with a control instrument adapted to actuate said movable plate, and a solids level control instrument adapted to detect changes in solids level in said upper surge chamber and to re-set said cycle timer instrument to maintain a substantially constant solids level in said upper solids surge zone.

32. An apparatus for the conveyance of granular solids which comprises a solids pressuring vessel containing therein an upper solids surge chamber, at least one inlet conduit thereinto for solids to be conveyed, solids flow control means associated with each such inlet conduit, a primary and a secondary solids pressuring chamber situated immediately below said upper solids surge chamber within said pressuring vessel, a primary solids inlet having a valve ($S_1$) and a secondary solids inlet having a valve ($S_3$) for solids communicating said upper solids surge chamber and said primary and secondary pressuring chambers respectively, a primary solids outlet having a valve ($S_2$) and a secondary solids outlet having a valve ($S_4$) for solids communicating said primary and secondary pressuring chambers respectively with a lower solids surge chamber disposed at the bottom of said pressuring vessel, a primary and a secondary fluid manifold communicating respectively with said primary and secondary pressuring chambers, an equalizing conduit provided with a valve ($F_3$) opening into said manifolds, said primary and secondary manifolds also communicating respectively via a primary pressure conduit provided with a valve ($F_2$) and via a secondary pressure conduit provided with a valve ($F_5$) with a high pressure fluid surge drum, said primary and secondary manifolds being provided respectively with a primary vent conduit provided with a valve ($F_4$) and a secondary vent conduit provided with a valve ($F_1$), said valves ($S_1$), ($S_2$), ($S_3$), ($S_4$), ($F_1$), ($F_2$), ($F_3$), ($F_4$) and ($F_5$) being actuated in accordance with a cycle timer instrument, said instrument being adapted to open and close said valves in sequence whereby each pressuring chamber is successively charged with solids, partially pressured by communication with the other pressuring chamber thereby equalizing the pressures thereof, pressured to the pressure of said lower solids surge chamber, discharged of solids, partially depressured by communication with the other pressuring chamber, depressured to the pressure of the upper solids surge chamber and then recharged with solids in alternation with the other pressuring chamber whereby solids are removed from said upper solids surge chamber and introduced into said lower solids surge chamber at substantially constant rates, a conduit communicating said fluid surge drum with said lower solids surge chamber, means for maintaining a higher pressure in said lower solids surge chamber than in said upper solids surge chamber, and an outlet conduit for solids discharge from said lower solids surge chamber whereby solids are substantially continuously received at a relatively low pressure into said upper solids surge zone and delivered at a relatively high pressure from said lower solids surge chamber.

References Cited in the file of this patent

UNITED STATES PATENTS

| Number | Name | Date |
|---|---|---|
| 941,024 | Mantius | Nov. 23, 1909 |
| 1,321,262 | Townsend | Nov. 11, 1919 |
| 1,825,707 | Wagner, Jr. | Oct. 6, 1931 |
| 1,935,843 | Goebels | Nov. 21, 1933 |
| 2,027,697 | Nielsen | Jan. 14, 1936 |
| 2,221,741 | Vogel-Jorgensen | Nov. 12, 1940 |
| 2,311,564 | Munday | Feb. 16, 1943 |
| 2,380,651 | Jeffery | July 31, 1945 |
| 2,509,983 | Morrow | May 30, 1950 |
| 2,541,077 | Leffer | Feb. 13, 1951 |

FOREIGN PATENTS

| Number | Country | Date |
|---|---|---|
| 180,397 | Great Britain | May 11, 1922 |